US012538372B2

(12) United States Patent
Zhou et al.

(10) Patent No.: US 12,538,372 B2
(45) Date of Patent: Jan. 27, 2026

(54) ASSOCIATING TRANSPORT IDENTIFIERS WITH QUALITY OF SERVICE FLOWS

(71) Applicant: ZTE Corporation, Guangdong (CN)

(72) Inventors: Xingyue Zhou, Shenzhen (CN); Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 497 days.

(21) Appl. No.: 18/166,643

(22) Filed: Feb. 9, 2023

(65) Prior Publication Data

US 2023/0189368 A1 Jun. 15, 2023

Related U.S. Application Data

(63) Continuation of application No. PCT/CN2020/108332, filed on Aug. 11, 2020.

(51) Int. Cl.
*H04W 4/00* (2018.01)
*H04L 69/18* (2022.01)
(Continued)

(52) U.S. Cl.
CPC ............. *H04W 76/16* (2018.02); *H04L 69/18* (2013.01); *H04W 28/0273* (2013.01); *H04W 76/11* (2018.02)

(58) Field of Classification Search
CPC ............................... H04W 76/11; H04L 69/18
See application file for complete search history.

(56) References Cited

U.S. PATENT DOCUMENTS

2006/0126547 A1 6/2006 Puuskari et al.
2018/0331944 A1 11/2018 Salkintzis
(Continued)

FOREIGN PATENT DOCUMENTS

CA 3120398 A1 7/2020
CN 110351893 A 10/2019
(Continued)

OTHER PUBLICATIONS

CNIPA, Rejection Decision for Chinese Application No. 202080103993. 9, mailed on Apr. 28, 2025, 14 pages with unofficial English translation.
(Continued)

*Primary Examiner* — Elisabeth Benoit Magloire
(74) *Attorney, Agent, or Firm* — Perkins Coie

(57) ABSTRACT

Methods, apparatus, and systems that can be implemented to associate User Datagram Protocol (UDP) based connection identifiers with appropriate Quality of Service (QoS) flows are disclosed to enable Access Traffic Steering, Switching and Splitting functionality at lower layers and to allow accurate measurements of Round-Trip Time for all traffic on a session. In one example aspect, a wireless communication method includes determining, by one or more nodes in a core network for a session that comprises at least one QoS flow, at least two identifiers identifying two connections associated with the at least one QoS flow. The two connections are established according to a UDP based protocol. The method also includes establishing, by the one or more nodes in the core network, a mapping between the at least two connection identifiers and the at least one QoS flow.

19 Claims, 13 Drawing Sheets

(51) Int. Cl.
  *H04W 28/02* (2009.01)
  *H04W 76/11* (2018.01)
  *H04W 76/16* (2018.01)

(56) References Cited

U.S. PATENT DOCUMENTS

| | | | |
|---|---|---|---|
| 2019/0132251 A1 | 5/2019 | Dao et al. | |
| 2019/0357082 A1 | 11/2019 | Kim et al. | |
| 2020/0120555 A1 | 4/2020 | Patil et al. | |
| 2020/0404538 A1* | 12/2020 | Zhu | H04L 67/30 |
| 2021/0127271 A1* | 4/2021 | Wu | H04W 12/0471 |
| 2022/0116327 A1* | 4/2022 | Salkintzis | H04W 28/0865 |
| 2022/0151004 A1* | 5/2022 | Sedlacek | H04W 8/082 |
| 2022/0418013 A1* | 12/2022 | Yu | H04W 28/0252 |

FOREIGN PATENT DOCUMENTS

| | | |
|---|---|---|
| CN | 110366271 A | 10/2019 |
| CN | 111492679 A | 8/2020 |
| WO | 2019/192528 A1 | 10/2019 |
| WO | 2019/197016 A1 | 10/2019 |
| WO | 2022032464 A1 | 2/2020 |

OTHER PUBLICATIONS

Office Action for Korean Application No. 10-2023-7004825, mailed Jul. 12, 2025, 7 pages with English summary.
3GPP "Study on Access Traffic Steering, Switch and Splitting support in the 5G system architecture Phase 2 (Release 17)," 3GPP TR 23.700-93 V0.2.0, Jul. 3, 2020.
International Search Report and Written Opinion for International Application No. PCT/CN2020/108332, mailed on May 11, 2021 (8 pages).
Motorola Mobility et al., "New Sol: MPQUIC-LL steering functionality," SA WG2 Meeting #139E (e-meeting), S2-2003788, Jun. 1-12, 2020, Elbonia (9 pages).
Huawei et al., "New Sol: New steering method QUIC for UDP," 3GPP TSG-SA WG2 Meeting #138E e-meeting, S2-2004013, Elbonia, Jun. 1-12, 2020 (5 pages).
Office Action for Chinese Patent Application No. 2020801039939, mailed Jun. 28, 2024 (15 pages).
First Examination Report for Indian Patent Application No. 202317005949, mailed Aug. 30, 2024 (6 pages).
Extended European Search Report for European Patent Application No. 20948963.2, mailed Mar. 19, 2024 (9 pages).
Office Action for Chinese Patent Application No. 202080103993.9, mailed Dec. 31, 2024 (11 pages).

* cited by examiner

| | 8 | 7 | 6 | 5 | 4 | 3 | 2 | 1 | |
|---|---|---|---|---|---|---|---|---|---|
| | Header form | Fixed bit | Long packet type | | Type-specific bits | | | | byte 0 |
| | Version | | | | | | | | byte 1<br>byte 4 |
| | Destination connection ID length | | | | | | | | byte 5 |
| | Destination connection ID | | | | | | | | byte 6<br>byte x |
| | Source connection ID length | | | | | | | | byte x+1 |
| | Source connection ID | | | | | | | | byte x+2<br>byte y |

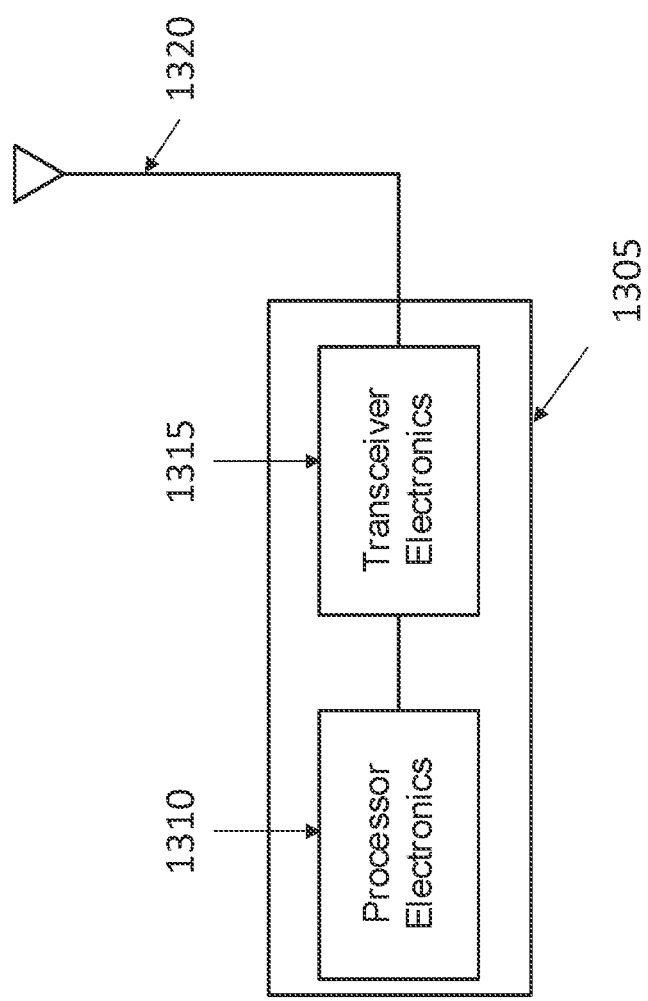

ASSOCIATING TRANSPORT IDENTIFIERS WITH QUALITY OF SERVICE FLOWS

CROSS REFERENCE TO RELATED APPLICATIONS

This patent document is a continuation of and claims benefit of priority to International Patent Application No. PCT/CN2020/108332, filed on Aug. 11, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques that can be implemented to associate User Datagram Protocol (UDP) based connection identifiers with appropriate Quality of Service (QoS) flows, thereby enabling Access Traffic Steering, Switching and Splitting functionality at lower layers and allowing accurate measurements of Round-Trip Time for all traffic on a session.

In one example aspect, a wireless communication method is disclosed. The method includes determining, by one or more nodes in a core network for a session that comprises at least one QoS flow, at least two identifiers identifying two connections associated with the at least one QoS flow. The two connections are established according to a UDP based protocol. The method also includes establishing, by the one or more nodes in the core network, a mapping between the at least two connection identifiers and the at least one QoS flow. A first connection of the at least two connections is configured to provide access to a network using a first access technology specified in a protocol suite and a second connection of the at least two connections is configured to provide access to the network using a second access technology specified in a different protocol suite.

In another example aspect, a wireless communication method is disclosed. The method includes receiving, by a communication device from one or more nodes in a core network for a session that comprises at least one QoS flow, a mapping between at least two connection identifiers and the at least one QoS flow. The two connections are established according to a UDP based protocol. A first connection of the at least two connections is configured to provide access to a network using a first access technology specified in a protocol suite and a second connection of the at least two connections is configured to provide access to the network using a second access technology specified in a different protocol suite. The method also includes performing, by the communication device, an operation based on the mapping.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 3 illustrates an example long header packet format for a QUIC packet.

FIG. 13 is a block diagram representation of a portion of a radio station in accordance with one or more embodiments of the present technology can be applied.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

The capability to use both Third Generation Partnership Project (3GPP) and Non-3GPP access networks has been provided in Long Term Evolution (LTE) technology. Techniques are known for determining how data needs to be split and transmitted over different access networks. In 5G communication systems, Access Traffic Steering, Switching and Splitting (ATSSS) requires the core network to provide similar functionality using rules that dictate how devices should use 3GPP and non-3GPP access networks that are available. The steering functionality includes higher layer steering functionality, such as Multipath Transmission Control Protocol (MPTCP) that is carried out above Internet Protocol (IP) in the protocol stack, as well as lower layer steering functionality, such as load balancing and priority-based steering.

The ATSSS capability can be supported by the user equipment (UE) and the 5G core network (5GC) by enabling a multi-access (MA) Protocol Data Unit (PDU) connectivity service. The MA PDU connectivity service can exchange PDUs between the UE and a data network by simultaneously using one 3GPP access network and one non-3GPP access network based on two independent N3/N9 tunnels between the PUD session anchor (PSA) and the access networks. The multi-access PDU connectivity service is realized by establishing a MA PDU session that can have user-plane resources on two access networks. The UE can request an MA PDU session when the UE is registered via both 3GPP and non-3GPP accesses, or when the UE is registered via one access only.

After the establishment of an MA PDU session, when there are user-plane resources on both access networks, the UE applies network-provided policy (e.g., ATSSS rules) and considers local conditions (e.g., network interface availability, signal loss conditions, user preferences, etc.) for deciding how to distribute the uplink traffic across the two access networks. Similarly, the User Plane Function (UPF) anchor of the MA PDU session applies network-provided policy (e.g., N4 rules) and feedback information received from the UE via the user-plane (e.g., access network unavailability or availability) for deciding how to distribute the downlink traffic across the two N3/N9 tunnels and two access networks. When there are user-plane resources on only one access network, the UE applies the ATSSS rules and considers local conditions for triggering the establishment or activation of the user plane resources over another access. The type of a MA PDU Session may be one of the following types: IPv4, IPv6, IPv4v6, and Ethernet.

Figure 1:
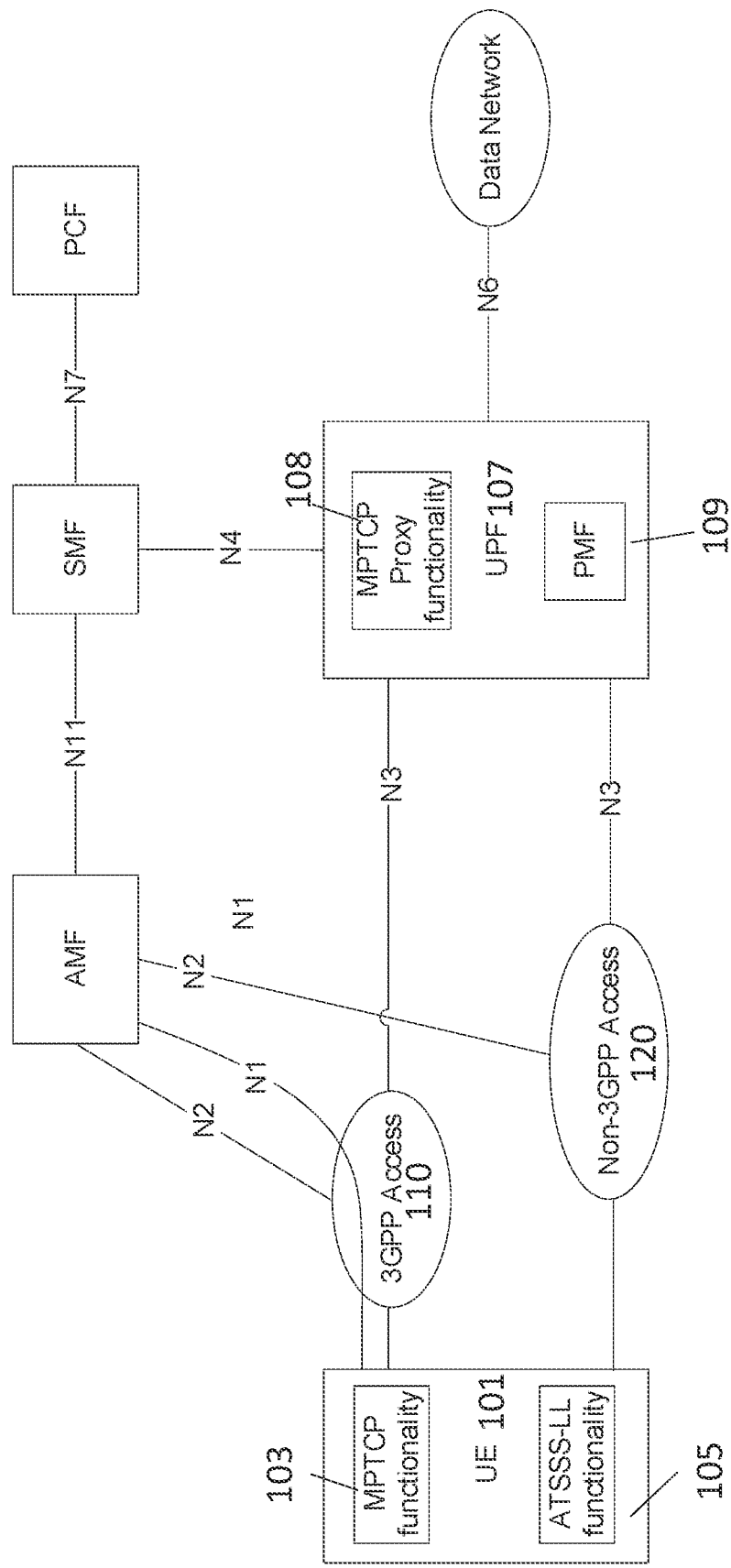
FIG. 1 illustrates an example Fifth-Generation (5G) system architecture that supports Access Traffic Steering, Switching and Splitting functionality.

FIG. 1 illustrates an example 5G system architecture that supports ATSSS. In this architecture, the User Equipment (UE) 101 supports one or more of the steering functionalities, such as MPTCP functionality 103 and/or ATSSS Low-Layer (ATSSS-LL) functionality 105. Each steering functionality in the UE enables traffic steering, switching and splitting across 3GPP access 110 and non-3GPP access 120 in accordance with the ATSSS rules provided by the network. In some embodiments, the ATSSS-LL functionality is mandatory in the UE for MA PDU session of type ethernet. The UPF 107 can support MPTCP proxy functionality 108, which communicates with the MPTCP functionality 103 in the UE by the MPTCP protocol. The UPF can also support ATSSS-LL functionality.

Figure 2:
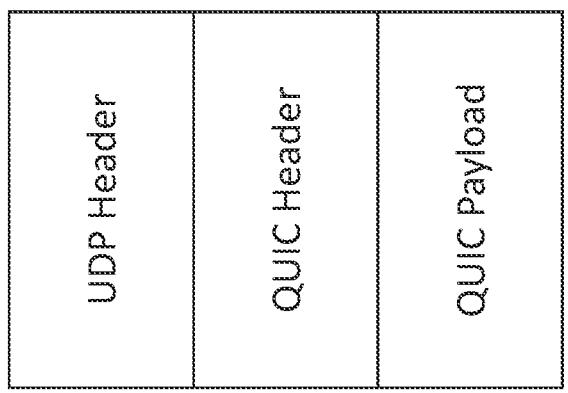
FIG. 2 shows an example QUIC packet format.

To support additional steering functionalities in ATSSS, the QUIC protocol, which is a multiplexed and secure general-purpose transport protocol can be used to provide one or more of the following:
Stream multiplexing
Stream and connection-level flow control
Low-latency connection establishment
Connection migration and resilience to Network Address Translation (NAT) rebinding
Authenticated and encrypted header and payload
The QUIC protocol uses the User Datagram Protocol (UDP) as a substrate to avoid requiring changes to legacy client operating systems and middle boxes. FIG. 2 shows an example QUIC packet format 200. A QUIC packet includes a UDP header, a QUIC header, and a QUIC payload. A QUIC connection is the context in which QUIC endpoints communicate. A QUIC endpoint is an entity that can participate in a QUIC connection by generating, receiving, and processing QUIC packets. There are only two types of endpoint in QUIC: client and server. QUIC's connection establishment combines version negotiation with the cryptographic and transport handshakes to reduce connection establishment latency. Once established, a connection can migrate to a different Internet Protocol (IP) address or port at either endpoint by either endpoint. Each connection possesses a set of connection identifiers (IDs), each of which can identify the connection. Connection IDs are independently selected by endpoints; each endpoint selects the connection IDs that its peer uses. The primary function of a connection ID is to ensure that changes in addressing at lower protocol layers (e.g., the UDP and/or IP layer) do not cause packets for a QUIC connection to be delivered to the wrong endpoint. Each endpoint selects connection IDs using an implementation-specific and/or deployment-specific method that allows packets with that connection ID to be routed back to the endpoint and to be identified by the endpoint upon receipt.

Figure 4:
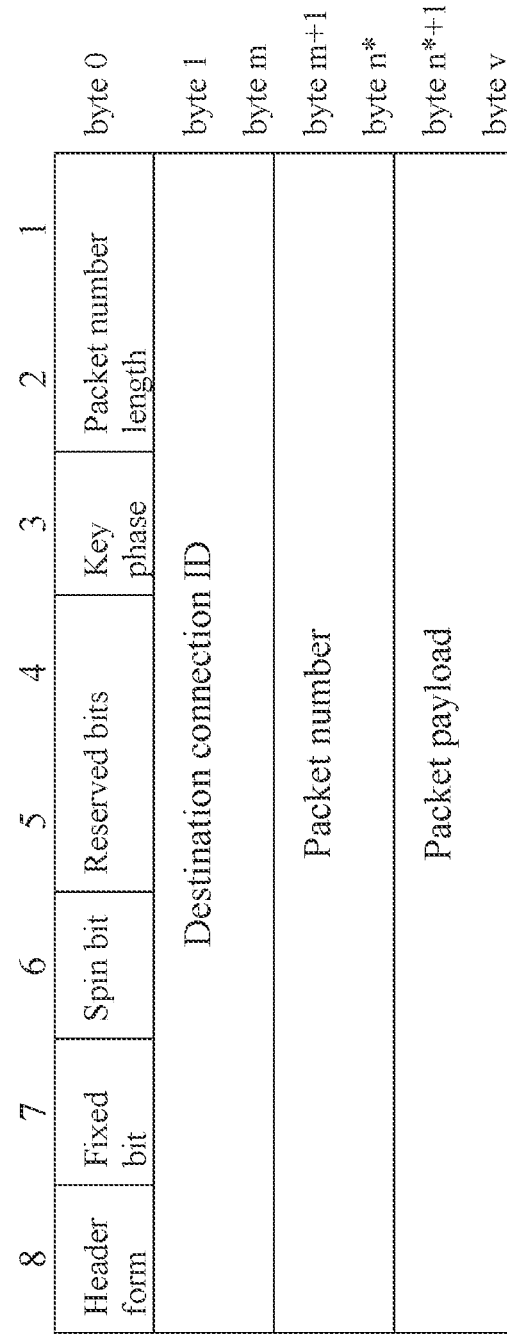
FIG. 4 illustrates an example short header packet format for a QUIC packet.

FIG. 3 illustrates an example long header packet format for a QUIC packet. QUIC packets with long headers include Source Connection ID and Destination Connection ID fields. These fields are used to set the connection IDs for new connections. FIG. 4 illustrates an example short header packet format for a QUIC packet. QUIC packets with short headers include only the Destination Connection ID without its explicit length. The length of the Destination Connection ID field is expected to be known to endpoints.

The initial connection ID issued by an endpoint is sent in the Source Connection ID field of the long packet header during the handshake. The connection ID randomly selected by the client in the initial packet. When an endpoint issues a connection ID, it must accept packets that carry this connection ID for the duration of the connection or until its peer invalidates the connection ID via a RETIRE_CONNECTION_ID frame. Connection IDs that are issued and not retired are considered active; any active connection ID is valid for use with the current connection at any time, in any packet type.

Figure 5:
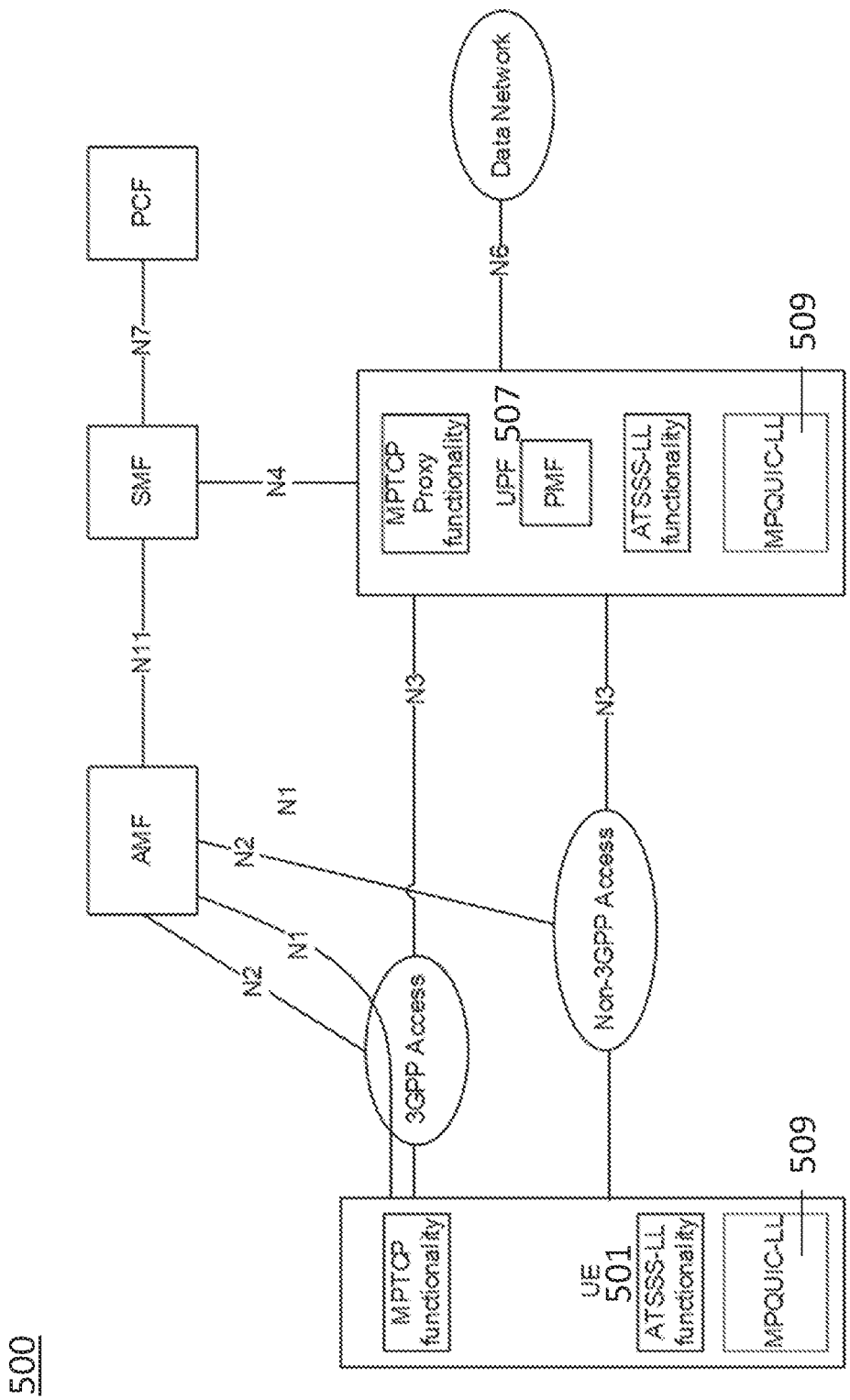
FIG. 5 illustrates an example 5G system architecture that supports QUIC-Low Layer (QUIC-LL) in accordance with the present technology.

In contrast to the high layer steering functionality that operates above the IP layer (e.g., MPTCP), an ATSSS steering functionality called QUIC-Low Layer (QUIC-LL) has been introduced to operate below the IP layer (e.g., similar to ATSSS-LL). FIG. 5 illustrates an example 5G system architecture 500 that supports QUIC-LL in accordance with the present technology. In this architecture, the UE 501 supports the MPQUIC-LL functionality 509. The UPF 507 also supports the MPQUIC-LL functionality 509.

Figure 6:
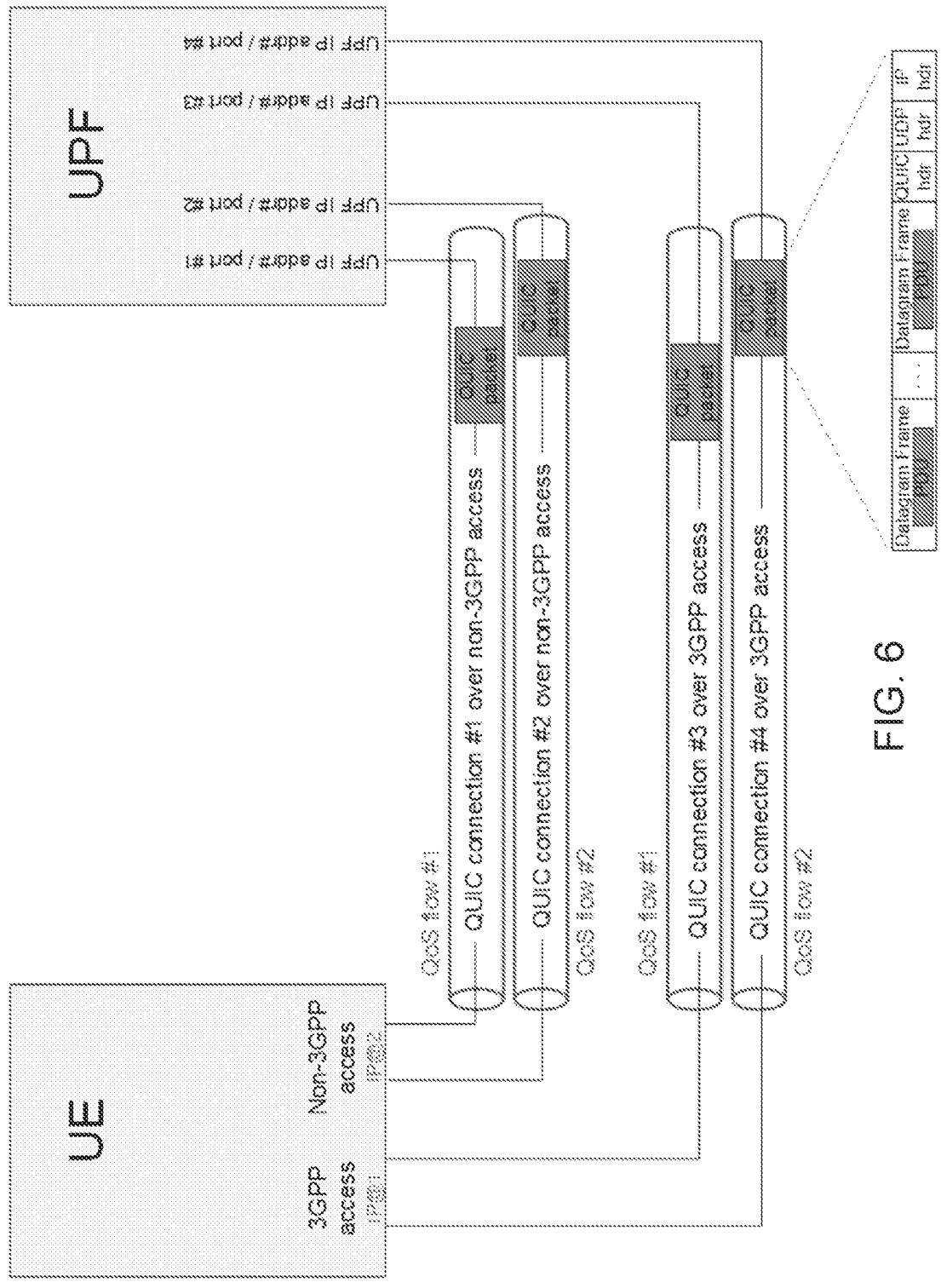
FIG. 6 illustrates an example of QUIC-LL and QoS model in 5G communication networks in accordance with the present technology.

FIG. 6 illustrates an example of QUIC-LL and QoS model 600 in 5G communication networks in accordance with the present technology. The 5G QoS model is based on QoS Flows. A QoS Flow ID (QFI) is used to identify a QoS Flow in the 5G System. User Plane traffic with the same QFI within a PDU Session receives the same traffic forwarding treatment (e.g. scheduling, admission threshold). The QFI is carried in an encapsulation header on N3 (and N9) (e.g., without any changes to the e2e packet header). QFI shall be used for all PDU Session Types. The QFI shall be unique within a PDU Session. The QFI may be dynamically assigned or may be equal to the 5Q. Within the 5GS, a QoS Flow is controlled by the SMF and may be preconfigured or established via the PDU Session Establishment procedure, or the PDU Session Modification procedure. Using QUIC-LL, each of the QoS flow can be associated with a QUIC connection. The following list provides a brief overview of how QUIC-LL operates and how it is applied to support ATSSS in a MA PDU session:

1. During the establishment of the MA PDU Session, the UE indicates whether it supports QUIC-LL and the network selects whether QUIC-LL is used for routing some or all traffic of the MA PDU Session across 3GPP and non-3GPP accesses.
2. If the network selects to apply the QUIC-LL steering functionality for the MA PDU Session, then, after the establishment of the MA PDU Session, the UE ensures there are N QUIC connections over 3GPP access and N QUIC connections over non-3GPP access, where N is the number of QoS flows of the MA PDU Session.
3. Each QUIC connection is mapped to one QoS flow. For example, as shown in FIG. 5, two QoS flows are assigned to the MA PDU Session. Two QUIC connections are established between the UE and the UPF over 3GPP access, and two QUIC connections are established between the UE and the UPF over non-3GPP access.
4. The QoS rules in the UE are used to steer the traffic of each QUIC connection to the associated QoS flow.

However, how a QUIC connection can be associated with the corresponding QoS flow currently remains unclear. In addition, referring back to FIG. 5, the UPF 507 supports Performance Measurement Functionality (PMF), which may be used by the UE to obtain access performance measurements over the user plane of 3GPP access and/or over the user plane of non-3GPP access. When an MA PDU Session is established, the network can provide the UE with Measurement Assistance Information. This information assists the UE in determining which measurements shall be performed over both access networks, as well as whether measurement reports need to be sent to the network. Performance measurement function protocol (PMFP) procedures are performed between a PMF in a UE and a PMF in the UPF. PMFP message is also UDP-based. Currently, the following PMF protocol messages can be exchanged between the UE and the PMF:

messages to allow for Round Trip Time (RTT) measurements, e.g., when the "Smallest Delay" steering mode is used;

messages for reporting Access availability/unavailability by the UE to the UPF.

The PMF protocol messages exchanged between the UE and UPF can use a Quality of Service (QoS) Flow associated with a default QoS rule over the available access(es) (e.g., a default QoS flow). Regarding the RTT measurement, a default QoS flow can be used to transport the measurement traffic, and the RTT value detected on this QoS flow is treated as the RTT for this PDU session via this access. However, the detected value cannot reflect the accurate RTT for all traffic in this PDU session via this access. For traffic of latency sensitive services, a per-QoS flow RTT measurement is needed.

This patent document discloses techniques that can be implemented in various embodiments enable QUIC connections to be associated with the appropriate QoS flows for 3GPP access and non-3GPP access. The disclosed techniques can also be implemented for PMFP procedures so that mappings between the QoS flow and PMFP connections can enable accurate per QoS flow RTT measurement.

Figure 7:
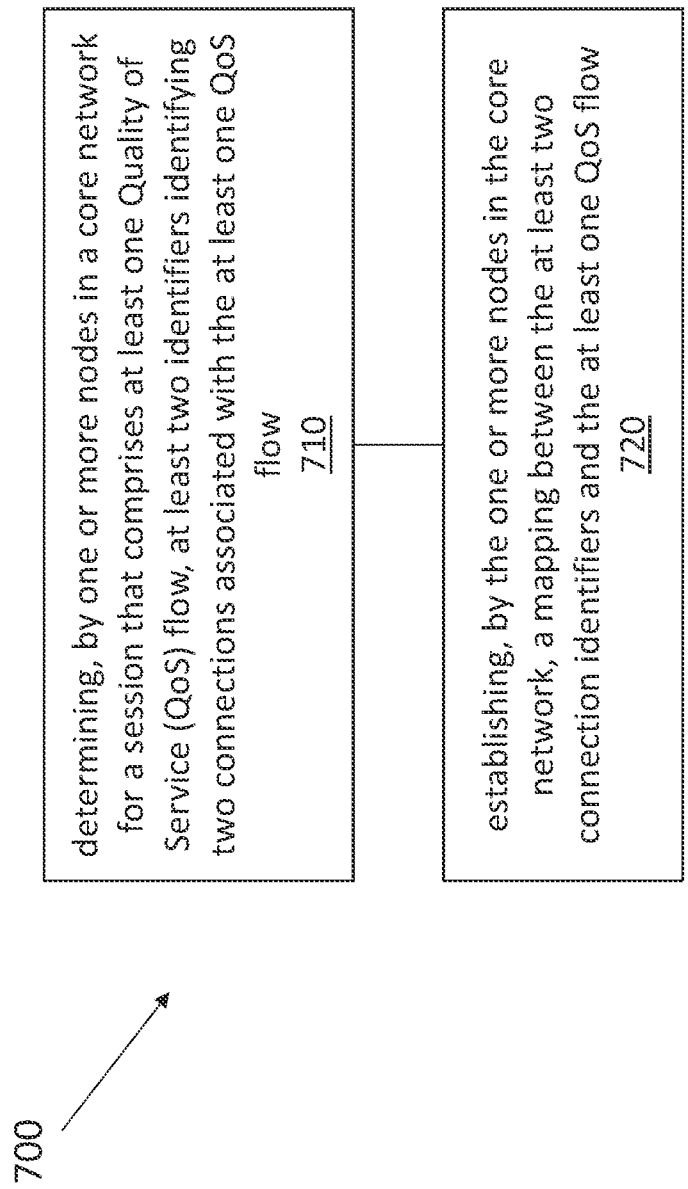
FIG. 7 is a flowchart representation of a method for wireless communication in accordance with the present technology.

FIG. 7 is a flowchart representation of a method 700 for wireless communication in accordance with the present technology. The method 700 includes, at operation 710, determining, by one or more nodes in a core network for a session that comprises at least one Quality of Service (QoS) flow, at least two identifiers identifying two connections associated with the at least one QoS flow. The two connections are established according to a User Datagram Protocol (UDP) based protocol. The method also includes, at operation 720, establishing, by the one or more nodes in the core network, a mapping between the at least two connection identifiers and the at least one QoS flow. A first connection of the at least two connections is configured to provide access to a network using a first access technology specified in a protocol suite (e.g., 3GPP access technology) and a second connection of the at least two QUIC connections is configured to provide access to the network using a second access technology specified in a different protocol suite (e.g., non-3GPP access technology).

In some embodiments, the one or more nodes comprise a User Plane Function (UPF) node. In some embodiments, the one or more nodes comprise a Session Management Function (SMF) node or a Policy Control Function (PCF) node.

In some embodiments, the UDP based protocol comprises a QUIC protocol that provides stream-multiplexed and secure transmissions. In some embodiments, determining of the at least two identifiers comprises determining, during a session establishment procedure to establish the session, destination identifiers for the two connections. In some embodiments, the method includes transmitting, by the one or more nodes in the core network, the mapping between the at least two connection identifiers and the at least one QoS flow to a communication device, the mapping comprising the destination identifiers for the two connections. In some embodiments, the at least one QoS flow comprises a default QoS flow, and the determining of the at least two identifiers comprises determining, during a session modification procedure to modify the session, source and destination identifiers for the two connections. In some embodiments, the method includes receiving, by the one or more nodes in the core network, a packet from the communication device using a connection. The packet comprises a header that includes a destination identifier corresponding to the connection and a source identifier identifying the communication device, and the connection is determined according to an Access Traffic Steering, Switching and Splitting rule. In some embodiments, the method includes receiving, by the one or more nodes in the core network, a packet from the communication device using a connection that is associated with a QoS flow. The packet comprises a header that includes a destination identifier corresponding to the connection and a source identifier identifying the communication device, and the QoS flow is determined according to a QoS rule.

In some embodiments, the UDP based protocol comprises a Performance Measurement Function Protocol. In some embodiments, the at least two connection identifiers comprise Internet Protocol (IP) addresses associated with the two connections. In some embodiments, the at least two connection identifiers comprise port numbers associated with the two connections. In some embodiments, the method includes transmitting, by the one or more nodes in the core network, the mapping between the at least two connection identifiers and the at least one QoS flow to a communication device to enable the communication device to perform packet filtering based on the mapping according to a QoS rule.

Figure 8:
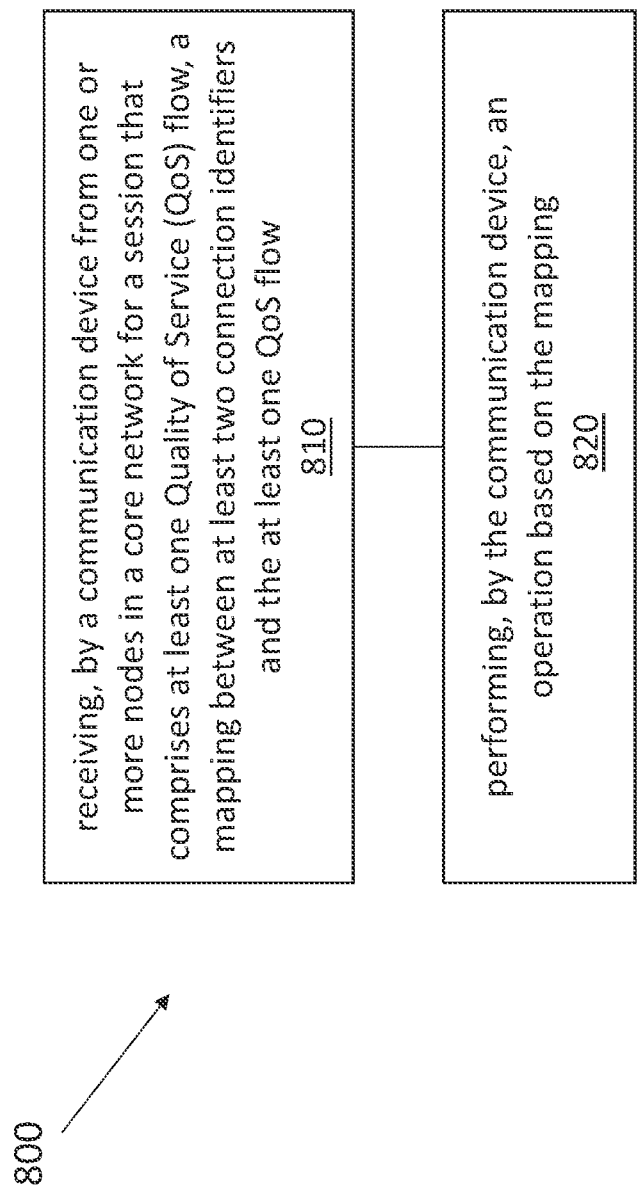
FIG. 8 is a flowchart representation of another method for wireless communication in accordance with the present technology.

FIG. 8 is a flowchart representation of a method 800 for wireless communication in accordance with the present technology. The method 800 includes, at operation 810, receiving, by a communication device from one or more nodes in a core network for a session that comprises at least one Quality of Service (QoS) flow, a mapping between at least two connection identifiers and the at least one QoS flow. The two connections are established according to a User Datagram Protocol (UDP) based protocol. A first connection of the at least two connections is configured to provide access to a network using a first access technology specified in a protocol suite (e.g., 3GPP access technology) and a second connection of the at least two connections is configured to provide access to the network using a second access technology specified in a different protocol suite (e.g., non-3GPP access technology). The method 800 includes, at operation 820, performing, by the communication device, an operation based on the mapping.

In some embodiments, the one or more nodes comprise a User Plane Function (UPF) node. In some embodiments, the one or more nodes further comprise a Session Management Function (SMF) node or a Policy Control Function (PCF) node.

In some embodiments, the UDP based protocol comprises a QUIC protocol that provides stream-multiplexed and secure transmissions. In some embodiments, the received mapping comprises destination identifiers for the two connections. In some embodiments, the received mapping comprises source and destination identifiers for the two connections. In some embodiments, performing the operation comprises transmitting, by the communication device, a packet to the one or more nodes in the core network using a connection that is determined according to an Access Traffic Steering, Switching and Splitting rule. The packet comprises a header that includes a destination identifier corresponding to the connection and a source identifier identifying the communication device. In some embodiments, performing the operation comprises transmitting, by the communication device, a packet to the one or more nodes in the core network using a connection associated with a QoS flow that is determined according to a QoS rule. The packet comprises a header that includes a destination identifier corresponding to the connection and a source identifier identifying the communication device.

In some embodiments, the UDP based protocol comprises a Performance Measurement Function Protocol. In some embodiments, the at least two connection identifiers comprise Internet Protocol (IP) addresses associated with the two connections. In some embodiments, the at least two connection identifiers comprise port numbers associated with the two connections. In some embodiments, performing the operation comprises performing, by the communication device, a packet filtering operation based on the mapping according to a QoS rule.

Some examples of the disclosed techniques are further described in the following example embodiments.

Embodiment 1

Figure 9:
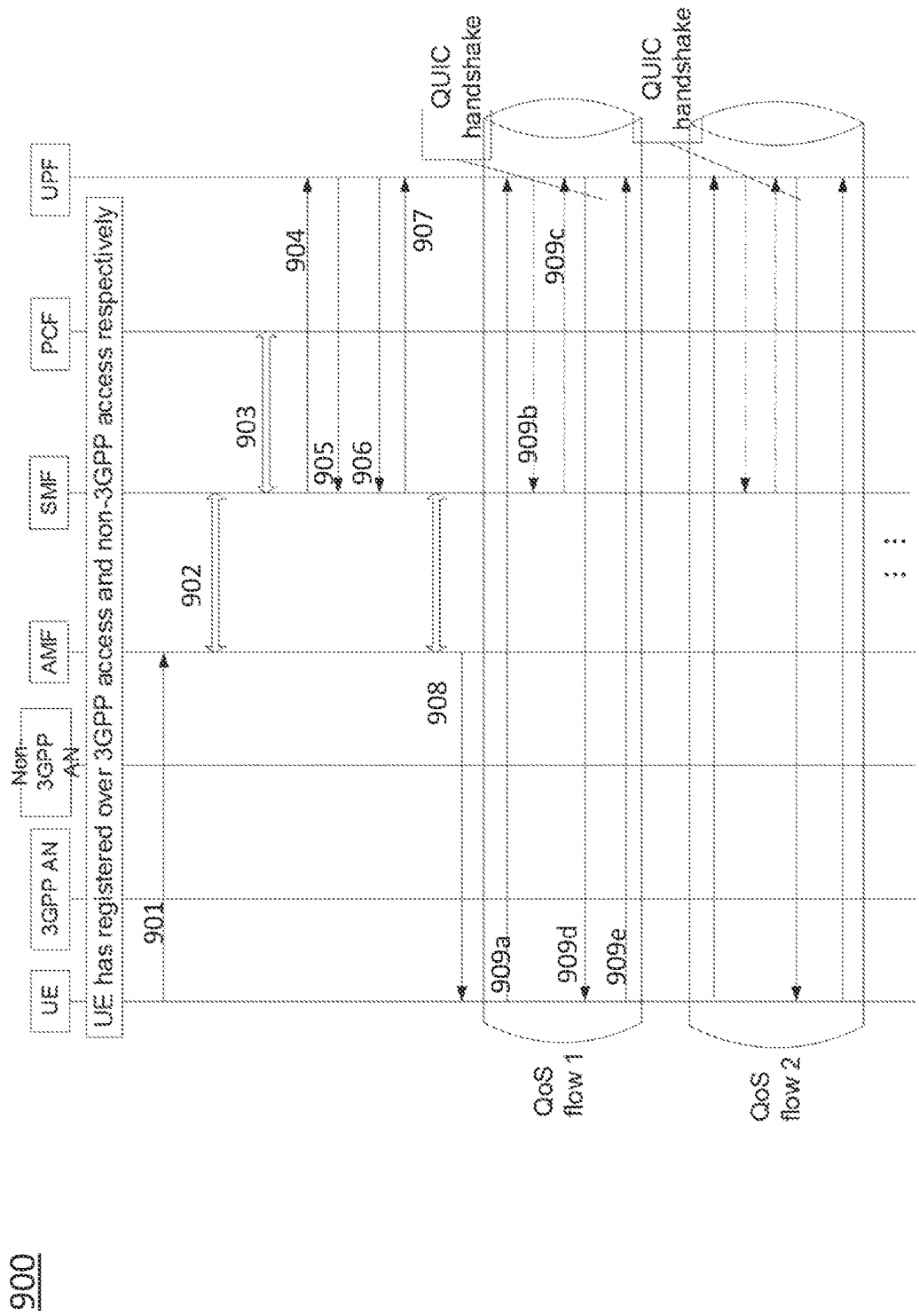
FIG. 9 illustrates an example signaling sequence to establish the mapping between QUIC connections and QoS flows in accordance with the present technology.

In some embodiments, the association or mapping between the QUIC connections and the QoS flows can be established in PDU session establishment procedures. FIG. 9 illustrates an example signaling sequence 900 to establish the mapping between QUIC connections and QoS flows in accordance with the present technology.

Here, the UE has registered to the 5G core network over 3GPP access and non-3GPP access respectively. Meanwhile, multiple QoS flows, e.g. two QoS flows, are established over the MA PDU session. In order to associate each QUIC connection with one QoS flow, the network manages to generate the mapping information of QUIC connection ID to the QoS flow and provide to the UE. Upon completion of the QoS flow establishment, the UE initiates to establish QUIC connection with the network. The example procedure shown in FIG. 9 is based on PDU session establishment procedure.

Operation 901: The UE sends a PDU session establishment request with request type as "MA PDU Request" in uplink (UL) Non-access stratum (NAS) Transport message to the Access and Mobility Management Function (AMF). The request indicates UE's ATSSS capabilities, including the QUIC-LL functionality.

Operation 902: The AMF selects an appropriate Session Management Function (SMF). The AMF then communicates with the SMF to exchange Nsmf_PDUSession_CreateSMContext request and response to create an association with the SMF. The SMF creates a Session Management (SM) context and responds to the AMF by providing an SM Context ID.

Operation 903: The SMF performs a session management policy association establishment procedure to establish an SM Policy Association with the PCF and get the default PCF Rules for the PDU Session. The PCF can provide policy information as well.

Operation 904: The SMF initiates an N4 Session Establishment procedure with the selected UPF and provides packet detection, QoS enforcement and reporting rules to be installed on the UPF for this PDU Session. The UPF can receive a combination of the parameters that incoming packets are requested to match, such as Local F-TEID, Network Instance, UE IP address(es), Service Data Flow (SDF) Filter(s) and/or Application ID, Packet Detection Information (PDI) including one or more QFI(s) to detect traffic pertaining to specific QoS flow(s).

Operation 905: The UPF sends an N4 session establishment response to the SMF.

Operation 906: The UPF generates the QUIC connection IDs/UDP port and sends the QUIC connection IDs to the SMF. A QoS flow is access agnostic but the QUIC connection is per access. Therefore, one QoS flow requires two QUIC connections: one QUIC connection is for 3GPP access and the other QUIC connection is for non-3GPP access. The number of QUIC connection IDs should be equal to two times of the number of established QoS flows when the MA PDU session are established over 3GPP access and non-3GPP access both.

Operation 907: The SMF proceeds to map the received QUIC connection IDs to QoS flows. Then SMF sends the mapping of the connection ID/UDP port and QFI information to the UPF. In this particular example, the QUIC connection IDs are mapped as follows:

9A: UPF QUIC connection #1/UDP port #A with QoS flow #1 for 3GPP access;

9B: UPF QUIC connection #2/UDP port #B with QoS flow #1 for non-3GPP access;

9C: UPF QUIC conenction #3/UDP port #A with QoS flow #2 for 3GPP access; and

9D: UPF QUIC connection #4/UDP port #B with QoS flow #2 for non-3GPP access.

Operation 908: The SMF sends the mapping of the connection ID and QFI information to the UE via PDU session establishment response in the Namf_Communication_N1N2MessageTransfer. The SMF can update the packet filter with the connection ID/UDP port information in the QoS rule and ATSSS rule including the connection ID per access type/UDP port to the UE as well.

The UE then initiates one or more QUIC connection handshake procedures to establish QUIC connections. The QUIC signaling messages are exchanged over the QoS flow that corresponds to the mapping information received in Operation 908.

Operation 909*a*: The UE sends the initial packet with a long header to the UPF. The long header includes source connection ID (e.g., UE connection ID) and destination connection ID (e.g., UPF connection ID in the mapping information received in Operation 908).

Operation 909*b*: The UPF can request the SMF to update N4 rules with the received UE connection ID in the long header.

Operation 909*c*: The SMF provides the updated N4 rules to the UPF. SDF filter for the QFI in the N4 rules is updated with the UE connection ID.

Operations 909*d-e*: The UPF sends the acknowledgement of the initial packet to the UE, and the UE completes the handshake procedure.

All the packets belonging to the QUIC connection are to be transported over the corresponding QoS flow subsequently. Similar operations can be performed for each QUIC connection handshake procedure. Once the QUIC connections are established, the UE can select a QUIC connection to send the user plane traffic based on the QUIC connection ID per access type information in the ATSSS rule. The UE can also select the QoS flow to send the user plane traffic based on the QUIC connection ID information in the QoS rule.

In some embodiments, in Operation 906, the UPF can send the QUIC connection IDs to the PCF node. The PCF proceeds to map the received QUIC connection IDs to QoS flows and sends the mapping information to the UPF and UE in Operations 907 and 908.

Alternatively, or in addition, after the UPF generates the QUIC connection IDs/UDP port, the UPF determines the mapping between the QUIC connection IDs and QoS flows. The UPF then sends the mapping information the UE via one or more other nodes in the core network.

Embodiment 2

Figure 10:
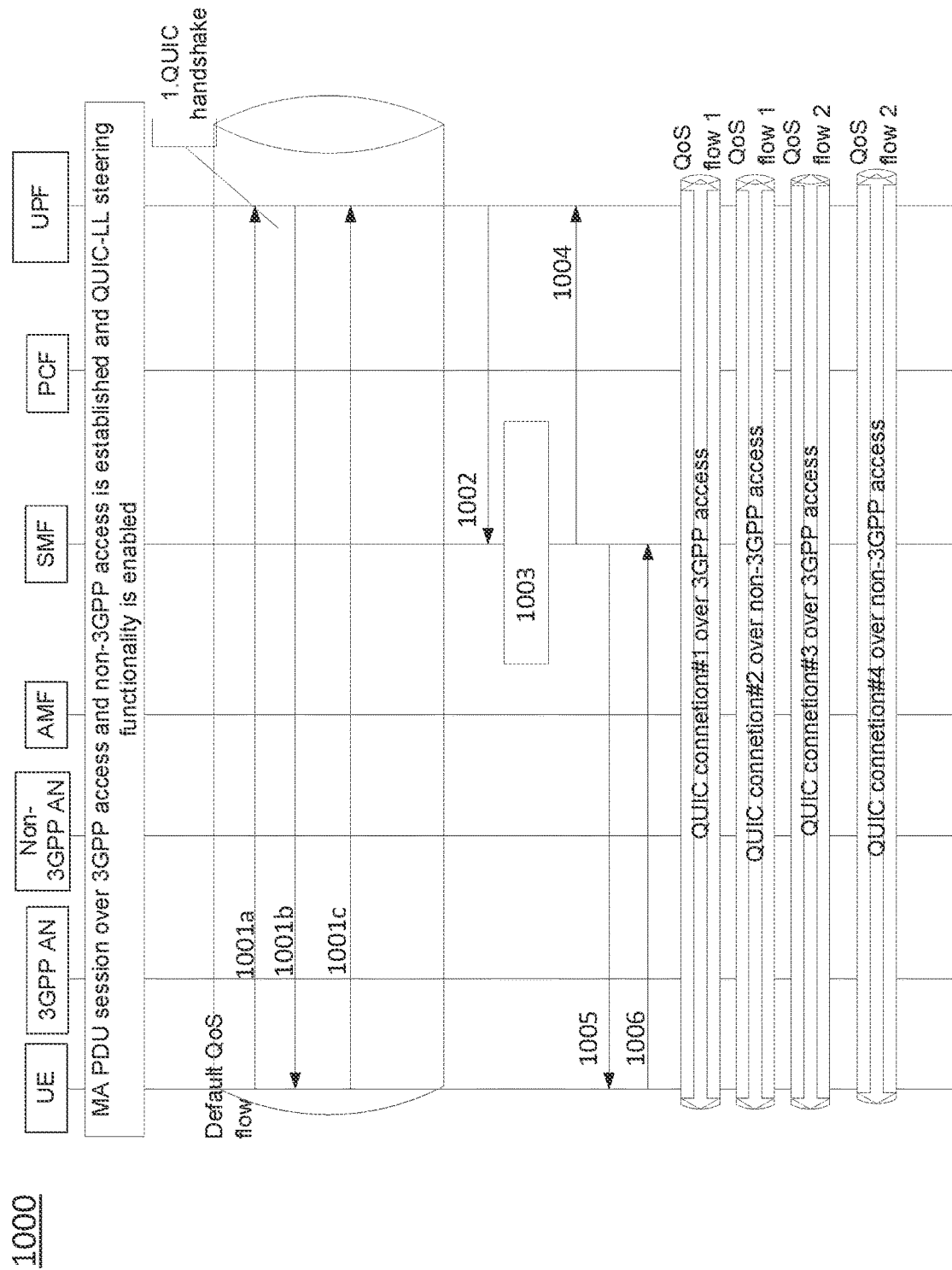
FIG. 10 illustrates another example signaling sequence to establish the mapping between QUIC connections and QoS flows in accordance with the present technology.

In some embodiments, the association or mapping between the QUIC connections and the QoS flows can be established in PDU session modification procedures. FIG. 10 illustrates an example signaling sequence 1000 to establish the mapping between QUIC connections and QoS flows in accordance with the present technology.

Here, the UE has registered to the 5G core network over 3GPP access and non-3GPP access respectively. Meanwhile, multiple QoS flows, e.g. two QoS flows, are established over the MA PDU session. In order to associate each QUIC connection with one QoS flow per access, the network manages to generate the mapping information of QUIC connection ID to the QoS flow and provide to the UE after QUIC connection establishment.

During the MA PDU session establishment procedure, the network provides to the UE information regarding IP@/UDP ports that the QUIC-LL functionality in UPF can use. For example, information about the QUIC-LL functionality is provided as follows:

10A: IP@1/UDP port #A for QUIC connections over 3GPP access;

10B: IP@2/UDP port #B for QUIC connections over non-3GPP access;

The UE initiates to establish QUIC connections over the default QoS flows. The QoS flow is access agnostic but QUIC connection is per access. Therefore, one QoS flow requires two QUIC connections: one QUIC connection is for 3GPP access and the other QUIC connection is for non-3GPP access. The number of QUIC connection IDs should be equal to two times of the number of established QoS flows when the MA PDU session are established over 3GPP access and non-3GPP access both.

Operation 1001*a*: The UE sends the initial packet with a long header to the UPF. The long header includes source connection ID (e.g., UE connection ID).

Operations 1001*b-c*: The UPF includes the destination connection ID (e.g., UPF connection ID) and sends the acknowledgement of the initial packet to the UE. The UE completes the handshake procedure.

Operation 1002: The UPF sends the established QUIC connection IDs (including both UE connection ID and UPF connection ID) to the SMF. The UPF can also provide the UDP port of the QUIC connection on UE to the SMF.

Operation 1003: The SMF assigns the QUIC connection IDs to the QoS flows for 3GPP access and non-3GPP access respectively. In this particular example, the QUIC connection IDs are mapped as follows:

10A: QUIC connection #1 with QoS flow #1 for 3GPP access;

10B: QUIC connection #2 with QoS flow #1 for non-3GPP access;

10C: QUIC conenction #3 with QoS flow #2 for 3GPP access;

10D: QUIC connection #4 with QoS flow #2 for non-3GPP access.

Operation 1004: The SMF sends the connection ID associated with the QFI (optionally with the access type, 3GPP access or non-3GPP access) reflecting the information in Operation 1003 to the UPF. The SMF provides the N4 rules to the UPF as well. The SDF filters for the QFI in the N4 rules can be updated with the QUIC connection ID.

Operations 1005-1006: The SMF sends the connection ID associated with the QFI (optionally with the access type, 3GPP access or non-3GPP access) to the UE via PDU session modification command. The SMF can also update the packet filter with the connection ID information in the QoS rule and ATSSS rule including the connection ID per access type to the UE as well. The UE sends PDU session modification complete message to the UPF.

The UE can select a QUIC connection to send the user plane traffic based on the QUIC connection ID per access type information in the ATSSS rule. The UE can also select the QoS flow to send the user plane traffic based on the QUIC connection ID information in the QoS rule.

In some embodiments, in Operations 1002 and 1003, the UPF sends the QUIC connection IDs to the PCF so that the PCF can determine the mapping between the QUIC connection IDs and the QoS flows. The PCF then sends the mapping information to the UPF and UE in Operations 1004-1005.

Alternatively, or in addition, the UPF determines the mapping between the QUIC connection IDs and the QoS flows. The UPF can send the mapping information to the UE via one or more other nodes in the core network.

Embodiment 3

Figure 11:
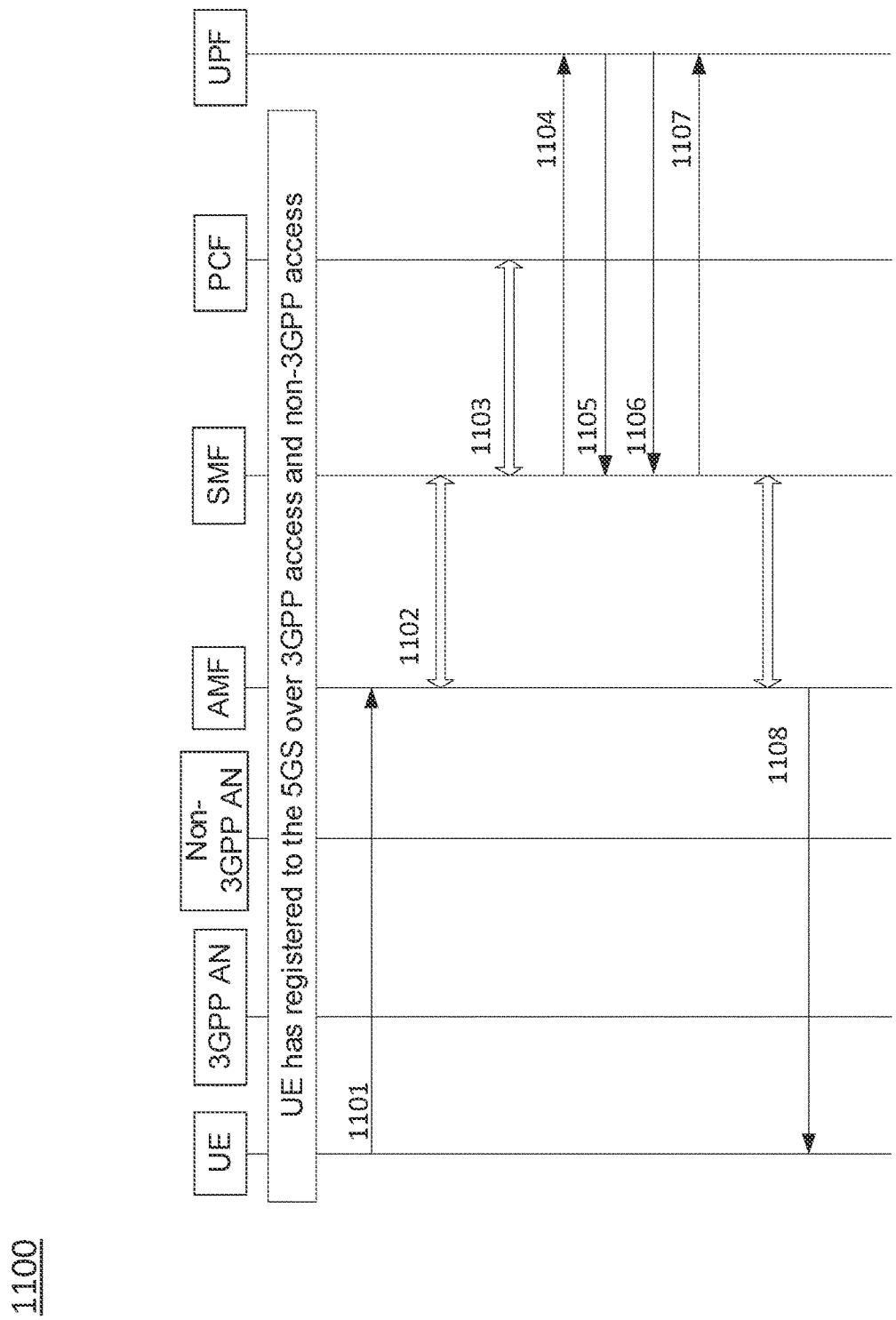
FIG. 11 illustrates an example signaling sequence to establish the mapping between Performance Measurement Function Protocol (PMFP) connections and QoS flows in accordance with the present technology.

To accurately reflect the RTT for traffic in the PDU session via an access type, per QoS flow measurement of the RTT is needed. Such measurement requires the UPF to provide information about PMFP IP/UDP port per QoS flow to the UE. FIG. 11 illustrates an example signaling sequence 1100 to establish the mapping between PMFP connections and QoS flows in accordance with the present technology.

Operation 1101: The UE sends the PDU session establishment request including an indication that the UE is able to perform RTT measurement per QoS flow with enhanced PMFP.

Operation 1102: The AMF selects an appropriate Session Management Function (SMF). The AMF then communicates with the SMF to exchange Nsmf_PDUSession_CreateSMContext request and response to create an association with the SMF. The SMF creates a Session Management (SM) context and responds to the AMF by providing an SM Context ID. The AMF and SMF confirm to enable the enhanced PMFP.

Operation 1103: The SMF performs a session management policy association establishment procedure to establish an SM Policy Association with the PCF and get the default PCC Rules for the PDU Session. The PCF confirm to enable the enhanced PMFP.

Operation 1104: The SMF initiates an N4 Session Establishment procedure with the selected UPF and provides packet detection, QoS enforcement and reporting rules to be installed on the UPF for this PDU Session. The UPF can receive a combination of the parameters that incoming packets are requested to match, such as Local F-TEID, Network Instance, UE IP address(es), SDF Filter(s) and/or Application ID, the PDI containing one or more QFI(s) to detect traffic pertaining to specific QoS flow(s).

Operation 1105: The UPF sends an N4 session establishment response to the SMF.

Operation 1106: The UPF generates the PMFP IP addresses and UDP port numbers and sends the information to the SMF. A QoS flow is access agnostic but the PMFP connection is per access. Therefore, one QoS flow requires two PMFP connections: one PMFP connection is for 3GPP access and the other PMFP connection is for non-3GPP access.

Operation 1107: The SMF sends the PMFP IP addresses/UDP port numbers and the associated QFI to the UPF. The SMF provides the updated N4 rules to the UPF as well. The SDF filters for the QFI in the N4 rules can be updated with the PMFP IP addresses/UDP port numbers. In this particular example, the PMFP IP addresses/UDP port numbers can be mapped as follows:

11A: PMFP IP@1, UDP port #A with QoS flow #1 for 3GPP access;
11B: PMFP IP@2, UDP port #B with QoS flow #1 for non-3GPP access;
11C: PMFP IP@3, UDP port #C with QoS flow #2 for 3GPP access;
11D: PMFP IP@4, UDP port #D with QoS flow #2 for non-3GPP access.

Alternatively, the UDP port numbers can be mapped as follows:

11E: UDP port #A with QoS flow #1 for 3GPP access;
11F: UDP port #B with QoS flow #1 for non-3GPP access;
11G: UDP port #C with QoS flow #2 for 3GPP access;
11H: UDP port #D with QoS flow #2 for non-3GPP access.

Operation 1108: The SMF sends the PMFP IP addresses/UDP port numbers and the associated QFI to the UE (e.g. in measurement assistance information) via PDU session establishment response. The SMF can also send the packet filter including the PMFP IP addresses/UDP port numbers in the QoS rule to the UE. With the QoS rule including packet filter with PMPF IP address/UDP port, the UE is able to know the PMPF protocol message is sent over which QoS flow. For example, if the UE performs the performance measurement of the QoS flow over one access technology, the UE can send the PMFP message with destination IP@ and/or UDP port associated with the QoS flow of that access technology.

In some embodiments, the UPF can send the PMFP IP address and UDP port number the PCF node in Operation 1106. The PCF proceeds to map the received the PMFP IP address and UDP port number to QoS flows and sends the mapping information to the UPF and UE in Operations 1107 and 1108. Alternatively, or in addition, after the UPF generates the PMFP IP address and UDP port number, the UPF determines the mapping between the PMFP IP address and UDP port number and QoS flows. The UPF then sends the mapping information the UE via one or more other nodes in the core network.

Figure 12:
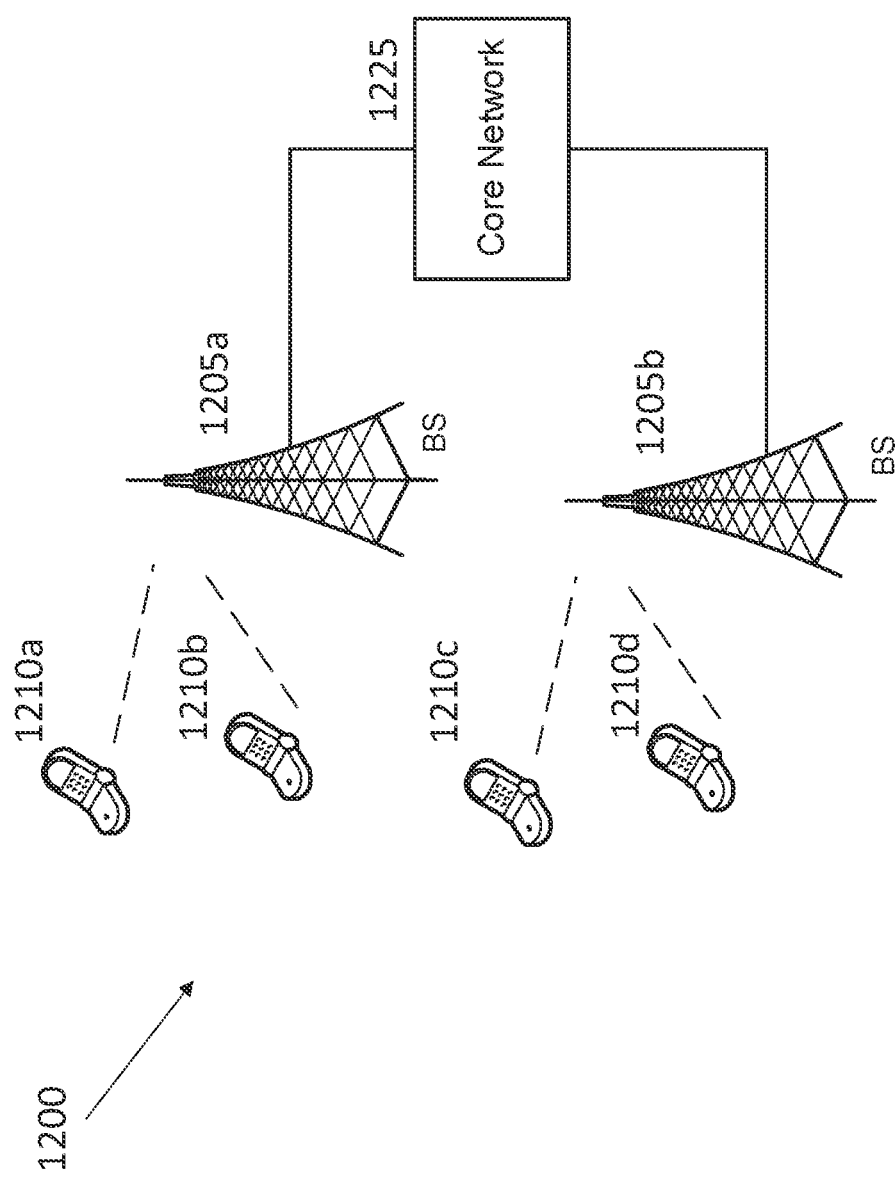
FIG. 12 shows an example of a wireless communication system where techniques in accordance with one or more embodiments of the present technology can be applied.

FIG. 12 shows an example of a wireless communication system 1200 where techniques in accordance with one or more embodiments of the present technology can be applied. A wireless communication system 1200 can include one or more base stations (BSs) 1205a, 1205b, one or more wireless devices 1210a, 1210b, 1210c, 1210d, and a core network 1225. A base station 1205a, 1205b can provide wireless service to wireless devices 1210a, 1210b, 1210c and 1210d in one or more wireless sectors. In some implementations, a base station 1205a, 1205b includes directional antennas to produce two or more directional beams to provide wireless coverage in different sectors.

The core network 1225 can communicate with one or more base stations 1205a, 1205b. The core network 1225 provides connectivity with other wireless communication systems and wired communication systems. The core network may include one or more service subscription databases to store information related to the subscribed wireless devices 1210a, 1210b, 1210c, and 1210d. A first base station 1205a can provide wireless service based on a first radio access technology, whereas a second base station 1205b can provide wireless service based on a second radio access technology. The base stations 1205a and 1205b may be co-located or may be separately installed in the field according to the deployment scenario. The wireless devices 1210a, 1210b, 1210c, and 1210d can support multiple different radio access technologies. The techniques and embodiments described in the present document may be implemented by the base stations of wireless devices described in the present document.

FIG. 13 is a block diagram representation of a portion of a radio station in accordance with one or more embodiments of the present technology can be applied. A radio station 1305 such as a base station or a wireless device (or wireless device) can include processor electronics 1310 such as a microprocessor that implements one or more of the wireless techniques presented in this document. The radio station 1305 can include transceiver electronics 1315 to send and/or receive wireless signals over one or more communication interfaces such as antenna 1320. The radio station 1305 can include other communication interfaces for transmitting and receiving data. Radio station 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the radio station 1305. In some embodiments, the radio station 1305 may be configured to perform the methods described herein.

It will be appreciated that the present document discloses techniques that can be implemented to associate UDP-based connection identifiers (e.g., QUIC connection IDs, PMFP IP addresses and/or UDP port numbers) with appropriate QoS flows, thereby enabling ATSSS functionality at lower layers and allowing accurate measurements of RTT of traffic. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   determining, by one or more nodes in a core network for a session that comprises at least one Quality of Service (QOS) flow, at least two identifiers identifying two connections associated with the at least one QoS flow, wherein the two connections are established according to a User Datagram Protocol (UDP) based protocol,
   wherein the one or more nodes comprise a User Plane Function (UPF) node and a Policy Control Function (PCF) node, and
   wherein the at least two connection identifiers are transmitted from the UPF node to the PCF node;
   establishing, by the PCF node of the one or more nodes in the core network, a mapping between the at least two identifiers and the at least one QoS flow, wherein a first connection of the two connections is configured to provide access to a network using a first access technology specified in a protocol suite and a second connection of the two connections is configured to provide access to the network using a second access technology specified in a different protocol suite; and transmitting, by the PCF node of the one or more nodes in the core network, the mapping between the at least two connection identifiers and the at least one QoS flow to a communication device.

2. The method of claim 1, wherein the UDP based protocol comprises a Quick UDP Internet Connections (QUIC) protocol that provides stream-multiplexed and secure transmissions.

3. The method of claim 1, wherein determining of the at least two identifiers comprises:
determining, during a session establishment procedure to establish a session, destination identifiers for the two connections.

4. The method of claim 2, wherein the at least one QoS flow comprises a default QoS flow, and wherein the determining of the at least two identifiers comprises:
determining, during a session modification procedure to modify the session, source and destination identifiers for the two connections.

5. The method of claim 1, comprising:
receiving, by the one or more nodes in the core network, a packet from a communication device using a connection, wherein the packet comprises a header that includes a destination identifier corresponding to the connection and a source identifier identifying the communication device, and wherein the connection is determined according to an Access Traffic Steering, Switching and Splitting rule.

6. The method of claim 1, comprising:
receiving, by the one or more nodes in the core network, a packet from a communication device using a connection that is associated with a QoS flow, wherein the packet comprises a header that includes a destination identifier corresponding to the connection and a source identifier identifying the communication device, and wherein the QoS flow is determined according to a QOS rule.

7. The method of claim 1, wherein the UDP based protocol comprises a Performance Measurement Function Protocol, wherein the at least two identifiers comprise Internet Protocol (IP) addresses associated with the two connections or port numbers associated with the two connections, wherein the method further comprises:
transmitting, by the one or more nodes in the core network, the mapping between the at least two identifiers and the at least one QoS flow to a communication device to enable the communication device to perform packet filtering based on the mapping according to a QoS rule.

8. A method for wireless communication, comprising:
receiving, by a communication device from one or more nodes in a core network for a session that comprises at least one Quality of Service (QOS) flow, a mapping between at least two identifiers identifying two connections and the at least one QoS flow, wherein the two connections are established according to a User Datagram Protocol (UDP) based protocol, and wherein a first connection of the two connections is configured to provide access to a network using a first access technology specified in a protocol suite and a second connection of the two connections is configured to provide access to the network using a second access technology specified in a different protocol suite,
wherein the one or more nodes comprise a User Plane Function (UPF) node and a Policy Control Function (PCF) node,
wherein the at least two connection identifiers are transmitted from the UPF node to the PCF node, and
wherein the mapping between the at least two connection identifiers and the at least one QoS flow is transmitted from the PCF node to the communication device; and
performing, by the communication device, an operation based on the mapping.

9. The method of claim 8, wherein the UDP based protocol comprises a Quick UDP Internet Connections (QUIC) protocol that provides stream-multiplexed and secure transmissions, and wherein the mapping comprises destination identifiers for the two connections or source and destination identifiers for the two connections.

10. The method of claim 8, wherein performing the operation comprises at least one of:
(1) transmitting, by the communication device, a packet to the one or more nodes in the core network using a connection that is determined according to an Access Traffic Steering, Switching and Splitting rule, wherein the packet comprises a header that includes a destination identifier corresponding to the connection and a source identifier identifying the communication device;
(2) transmitting, by the communication device, a packet to the one or more nodes in the core network using a connection associated with a QoS flow that is determined according to a QoS rule, wherein the packet comprises a header that includes a destination identifier corresponding to the connection and a source identifier identifying the communication device; or
(3) performing, by the communication device, a packet filtering operation based on the mapping according to a QoS rule, wherein the UDP based protocol comprises a Performance Measurement Function Protocol, wherein the at least two identifiers comprise Internet Protocol (IP) addresses associated with the two connections or port numbers associated with the two connections.

11. A communication apparatus implemented as one or more nodes in a core network for a session that comprises at least one Quality of Service (QOS) flow, comprising a processor configured to:
determine, by the one or more nodes in the core network, at least two identifiers identifying two connections associated with the at least one QoS flow, wherein the two connections are established according to a User Datagram Protocol (UDP) based protocol,
wherein the one or more nodes comprise a User Plane Function (UPF) node and a Policy Control Function (PCF) node, and
wherein the at least two connection identifiers are transmitted from the UPF node to the PCF node;
establish, by the PCF node of the one or more nodes in the core network, a mapping between the at least two identifiers and the at least one QoS flow, wherein a first connection of the two connections is configured to provide access to a network using a first access technology specified in a protocol suite and a second connection of the two connections is configured to provide access to the network using a second access technology specified in a different protocol suite; and transmit, by the PCF node of the one or more nodes in the core network, the mapping between the at least two connection identifiers and the at least one QoS flow to a communication device.

12. The communication apparatus of claim 11, wherein the UDP based protocol comprises a Quick UDP Internet Connections (QUIC) protocol that provides stream-multiplexed and secure transmissions.

13. The communication apparatus of claim 11, wherein the at least one QoS flow comprises a default QoS flow, and wherein the processor is configured to determine the at least two identifiers by:
   determining, during a session modification procedure to modify the session, source and destination identifiers for the two connections.

14. The communication apparatus of claim 11, wherein the processor is configured to:
   receive a packet from a communication device using a connection, wherein the packet comprises a header that includes a destination identifier corresponding to the connection and a source identifier identifying the communication device, and wherein the connection is determined according to an Access Traffic Steering, Switching and Splitting rule.

15. The communication apparatus of claim 11, wherein the processor is configured to:
   receive a packet from a communication device using a connection that is associated with a QOS flow, wherein the packet comprises a header that includes a destination identifier corresponding to the connection and a source identifier identifying the communication device, and wherein the QoS flow is determined according to a QoS rule.

16. The communication apparatus of claim 11, wherein the UDP based protocol comprises a Performance Measurement Function Protocol, wherein the at least two identifiers comprise Internet Protocol (IP) addresses associated with the two connections or port numbers associated with the two connections, wherein the processor is configured to:
   transmit the mapping between the at least two identifiers and the at least one QoS flow to a communication device to enable the communication device to perform packet filtering based on the mapping according to a QoS rule.

17. A communication apparatus, comprising a processor configured to:
   receive, from one or more nodes in a core network for a session that comprises at least one Quality of Service (QOS) flow, a mapping between at least two identifiers identifying two connections and the at least one QoS flow, wherein the two connections are established according to a User Datagram Protocol (UDP) based protocol, and wherein a first connection of the two connections is configured to provide access to a network using a first access technology specified in a protocol suite and a second connection of the two connections is configured to provide access to the network using a second access technology specified in a different protocol suite,
   wherein the one or more nodes comprise a User Plane Function (UPF) node and a Policy Control Function (PCF) node,
   wherein the at least two connection identifiers are transmitted from the UPF node to the PCF node, and
   wherein the mapping between the at least two connection identifiers and the at least one QoS flow is transmitted from the PCF node to the communication device; and
   perform an operation based on the mapping.

18. The communication apparatus of claim 17, wherein the UDP based protocol comprises a Quick UDP Internet Connections (QUIC) protocol that provides stream-multiplexed and secure transmissions, and wherein the mapping comprises destination identifiers for the two connections or source and destination identifiers for the two connections.

19. The communication apparatus of claim 17, wherein the processor is configured to perform the operation by:
   (1) transmitting a packet to the one or more nodes in the core network using a connection that is determined according to an Access Traffic Steering, Switching and Splitting rule, wherein the packet comprises a header that includes a destination identifier corresponding to the connection and a source identifier identifying the communication apparatus;
   (2) transmitting a packet to the one or more nodes in the core network using a connection associated with a QoS flow that is determined according to a QoS rule, wherein the packet comprises a header that includes a destination identifier corresponding to the connection and a source identifier identifying the communication apparatus; or
   (3) performing a packet filtering operation based on the mapping according to a QoS rule, wherein the UDP based protocol comprises a Performance Measurement Function Protocol, wherein the at least two identifiers comprise Internet Protocol (IP) addresses associated with the two connections or port numbers associated with the two connections.

* * * * *